Patented Feb. 3, 1931

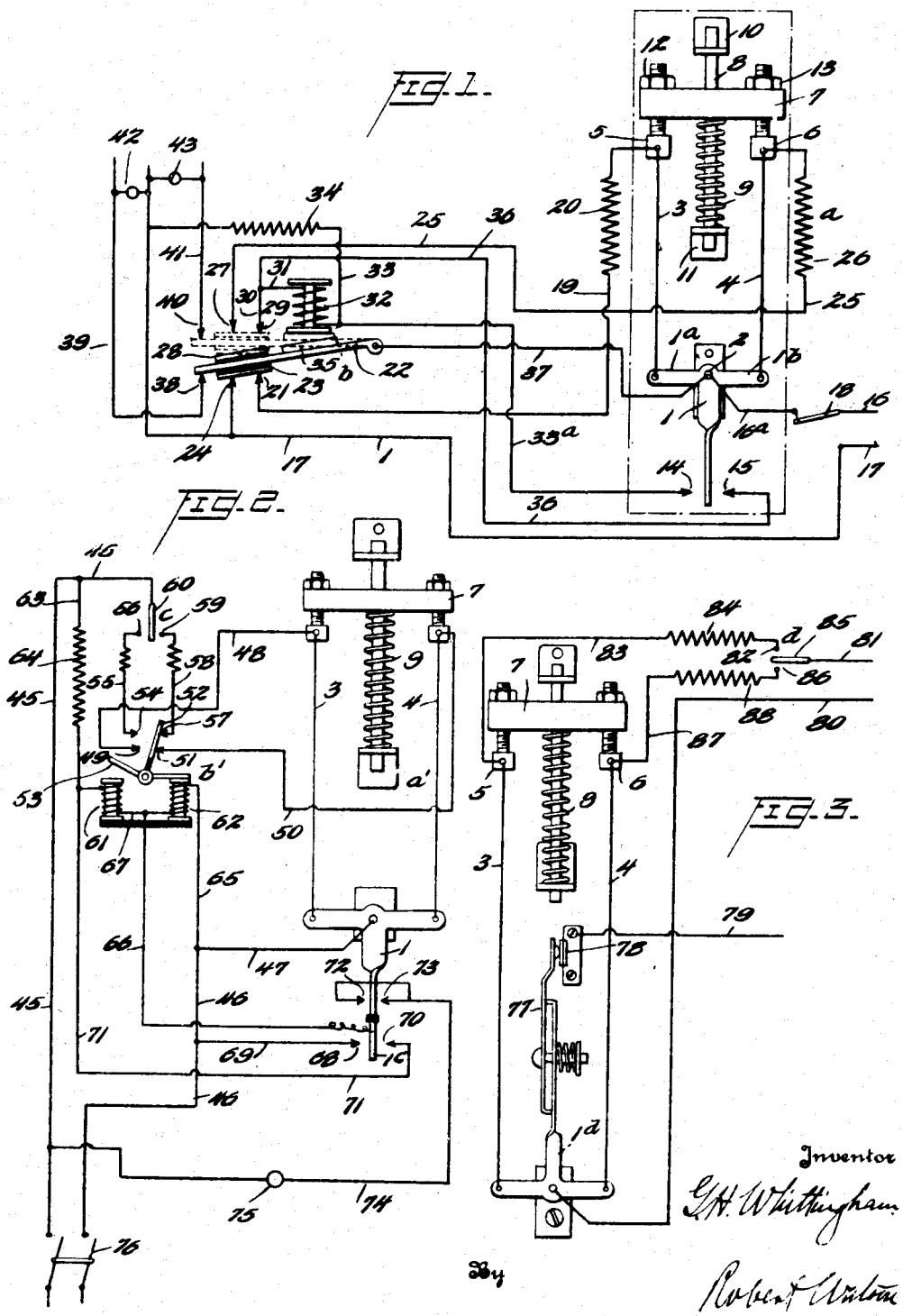

1,791,457

UNITED STATES PATENT OFFICE

GEORGE H. WHITTINGHAM, OF BALTIMORE, MARYLAND, ASSIGNOR TO MONITOR CONTROLLER COMPANY, OF BALTIMORE, MARYLAND, A CORPORATION OF MARYLAND

COMPENSATING THERMAL RELAY

Application filed April 29, 1927. Serial No. 187,503.

This invention relates to electrically operated thermostats adapted to control electric circuits and to compensate for variations in atmospheric temperature, so that the circuit closing or opening means will operate the same under all weather conditions. In carrying out the invention, I provide a thermostat comprising a pivoted switch member, two thermally expansible wires connected to the switch member at opposite sides of its pivotal axis, a take-up device adapted to apply equal tension to said wires, and means for passing an electric current through either of said wires. The wires are alike and of equal length, and when no current is flowing in either wire they will hold the switch member in fixed position, because both wires will expand and contract alike under changes in atmospheric temperature, and the tension device constantly applies equal tension to both wires. When current is passed through one wire sufficient to heat and expand the same, the tension applied to the switch member through the other wire will cause the switch member to rock from its normal position, to open or close the circuit.

As repeated use of only one of the expansible wires might result in a permanent stretch of the wire, I provide means whereby the heating current may be passed through the wires alternately. In one form of the invention, I provide an automatic pole-changing switch, controlled by the thermostat switch member, for maintaining one of the expansible wires in an electric circuit for a predetermined period of time and for then connecting the other expansible wire in the same circuit for a predetermined period of time, and for repeating these operations indefinitely. These periods will ordinarily be the same for both wires, but they may be varied, as desired.

In another form of the invention, I provide an automatic pole-changing switch, controlled by the thermostat switch member, for making up a circuit through the expansible wires alternately, a manually operable switch being employed for completing the circuit, the arrangement being such that the operator cannot close the circuit through the same expansible wire repeatedly, but can only close the circuit through the wire selected by the pole-changing device.

In the drawing, I have also illustrated a modification in which the pole-changing device is omitted, and the operator is free to close the circuit through either of the expansible wires, as desired, according to whether the thermostat switch is to be used as a circuit closing or circuit opening device.

In the accompanying drawing,

Fig. 1 is a diagrammatic view illustrating a compensating thermal relay in which the thermally expansible wires are alternately included in the main circuit automatically;

Fig. 2 is a similar view of a compensating relay in which the circuit connections through the expansible wires are automatically and alternately changed, and a manually operable switch closes the circuit; and, Fig, 3 is a similar view of a compensating relay in which the main circuit may be closed manually through either of the expansible wires.

Referring to Fig. 1 of the drawing, a represents a thermally operated relay comprising a switch member 1, pivotally mounted as indicated at 2, and having arms 1ª and 1ᵇ projecting laterally in opposite directions from the pivotal axis of the member. The arms 1ª and 1ᵇ are connected by thermally expansible wires 3 and 4 to binding posts 5 and 6, respectively, which binding posts are adjustably mounted in a cross-head of insulating material 7, which is slidably mounted upon a vertically arranged guide rod 8. This rod extends through the cross-head midway between the binding posts 5 and 6, and a spring 9, surrounding the guide rod, constantly presses the cross-head away from the switch member 1. The rod 8 is secured to brackets 10 and 11 arranged above and below the cross-head, and the spring 9 is interposed between the latter bracket and the cross-head. The binding posts 5 and 6 have threaded stems, and nuts 12 and 13 are provided on these stems for adjusting the binding posts toward and from the switch member 1. The parts just described constitute a tensioning or take-up device for applying constant and equal tension to the expansible wires 3 and 4. When the temperature of both wires is the same, the switch member 1 is held by the expansible wires midway between stationary contacts 14 and 15.

Supply wires, leading from a suitable current source, are indicated at 16 and 17. The supply wire 16 is connected to switch member 1 through a manually operable switch 18 and conductor 16$^a$. A circuit extends from the switch member 1 through expansible wire 3 and a conductor 19 and resistance 20 to the stationary contact 21 of a pole-changing switch $b$. This switch comprises a lever 22, having an insulated contact piece 23, which connects the contact 21 with a contact 24, and the latter contact is connected to the supply wire 17, as shown. Another circuit extends from the supply wire 16, through switch member 1 and expansible wire 4 to conductor 25, in which is included resistance 26, said conductor 25 leading to a stationary contact 27 on the pole-changing switch $b$. The lever 22 of the latter switch carries an insulated contact 28, which is adapted to connect the stationary contact 27 with a contact 29, and the latter contact is connected by conductor 30 to one terminal 31 of the coil of a magnet 32. The other terminal of said coil is connected by conductor 33, through a resistance 34 to the supply wire 17. Thus, when the switch lever 22 is in the full line position shown in Fig. 1, and the switch 18 is closed, a circuit will be made up through the expansible wire 3 from one side of the supply circuit to the other, and when the lever 22 is in the dotted line position, the circuit will be made up from the supply wire 16 through expansible wire 4 to the magnet coil 32 and from said coil through conductor 33 to the side 17 of the supply circuit. The switch lever 22 carries an armature 35, and when the magnet is energized it causes the lever to shift from the full line position to the dotted line position. The contact 29 of the pole-changing switch is connected by conductor 36 to the contact 15 of the thermostat switch, and the contact 14, of the latter switch, is connected by conductors 33 and 33$^a$ to the supply wire 17.

The switch lever 22 of the pole-changing switch may be utilized to make and break circuits for signaling or other purposes. This lever is connected by conductor 37 to the switch member 1, and the free end of the lever is shown resting against the contact 38, connected to a conductor 39. When the lever is moved to the dotted line position, it engages a contact 40 connected to a conductor 41. A lamp or signalling device 42 is shown connected between the conductor 39 and the conductor 17, and the signaling device 43 is shown connected between the conductor 41 and the conductor 17. When the switch 18 is closed and the lever 22 is in the full line position, current will flow from the line 16, through the lever to conductor 39 and signaling device 42 to the supply wire 17, and when the lever 22 is moved to the dotted line position, this circuit will be broken and a circuit will be established through conductor 41 and signaling device 43 to the supply wire 17.

The operation of the device shown in Fig. 1 is as follows: Normally, the switch lever 22 occupies the position shown in full lines in the drawing, and its insulated contact piece 23 makes up a circuit through the expansible wire 3. When the switch 18 is closed, current will flow through said wire and conductor 19 to the contact piece 23 and thence to conductor 17. With a given current flowing in the circuit, sufficient to cause expansion of the wire 3, this expansion will permit the switch arm 1 to rock, under tension applied through the wire 4, and in a pre-determined time the switch member 1 will engage the contact 15 and establish a circuit from conductor 16, through switch member 1 and conductor 36 to the magnet coil 32, and thence through conductor 33 to the supply wire 17. The magnet will thus become energized and cause the arm 22 to lift away from the contacts 21, 24 and 38, and the contact piece 28 on the switch lever will bridge the contacts 27 and 29 and the lever will engage the contact 40. When the lever lifts, it will be seen that the circuit through the expansible wire 3 will be broken at the contacts 21 and 24, and a circuit will be established through the expansible wire 4 by engagement of the contact piece 28 with the contacts 27 and 29. This circuit extends from the side 16 of the supply circuit through switch member 1, expansible wire 4, and conductor 25 to the contact 27, thence through contact piece 28 and contact 29 to conductor 30 and through magnet coil 32 to conductor 33, and thence to the supply wire 17. It is to be noted that in addition to establishing a circuit through the expansible wire 4, the upward movement of the lever establishes another connection for the magnet coil 32 so that the magnet will retain the lever in its upper position after its initial circuit is broken at the contact 15, which occurs immediately after the circuit through the expansible wire 3 is broken and said expansion wire has started to cool and contract. The circuit through the expansion wire 4 now having been established, the current through the latter wire causes it to expand and in a pre-determined time the contact member 1 is caused to rock against the contact 14. When the member 1 engages said contact, current flows directly from the side 16 of the supply circuit through switch member 1, contact 14 and conductor 33$^a$ to conductor 33, and thence to the supply wire 17, thus forming a shunt around the magnet coil 32. The magnet thus becomes de-energized and the switch arm 22 drops, opening the circuit through the expansible wire 4 at the contacts 27 and 29, and closing the circuit through the expansible wire 3 at the contacts 21 and 24. After a predetermined interval, the wire 3 will again expand and the switch arm 1 will engage the contact 15 and the magnet 32 will lift the switch arm 22, breaking the circuit through wire 3 and establishing a circuit through the wire 4 and through the magnet coil, and after another pre-determined interval the wire 4 will expand and cause the switch arm 1 to move against the contact 14 and short circuit the magnet, thus breaking the circuit through the wire 4 and establishing the circuit through the wire 3.

In these different positions of the switch member 22, said member may be caused to open or close signaling or other circuits.

From the foregoing, it will be seen that the expansible wires 3 and 4 are placed in circuit alternately and if there is any permanent stretch in the wires due to repeated heating and cooling, both wires will be affected alike, and the adjustment of the switch member 1 with relation to its contacts 14 and 15 will not be disturbed. Also, both wires will expand and contract alike under changes in atmospheric temperature and the adjustment of the member 1 will not be affected by extreme changes in the temperature of the atmosphere. Where it is desired to have the switch member 22 remain in its two positions for equal lengths of time, the switch member 1 will be set, as shown in the drawing, midway between the contacts 14 and 15. If it is desired to have the switch arm 22 remain in one position for a longer or shorter period than in the other position, this may be accomplished by adjusting one of the binding posts 5, 6, so as to set the switch member 1 closer to one of the stationary contacts, 14—15, than the other.

In Fig. 2 of the drawing, the thermostat switch $a'$ is shown in association with a switch $b'$, which automatically changes the circuit connections through the expansible wires 3—4, so that current will flow through these wires alternately. The switch $b'$, however, does not close the circuit through these wires, the closure of the circuit being accomplished by a manually controlled switch $c$. In this figure of the drawing, the thermostat device is the same as in Fig. 1, except that there is added to the switch member 1 an insulated contact piece $1^c$. The supply wires are indicated at 45 and 46. A conductor 47 leads from the supply wire 46 to the switch member 1 of the thermostat device. From said member a circuit extends through the expansible wire 3 and conductor 48 to a contact 49 on the pole-changing switch $b'$, and another circuit extends from the switch member 1 through an expansible wire 4 and conductor 50 to a contact 51 on the pole-changing switch. A switch arm 52, operated by the armature 53 of said switch, is adapted to engage the contacts 49 and 51 alternately. When the switch arm engages the contact 49, it also engages a contact 54 connected by conductor 55 to a contact 56 on the hand switch $c$, and when the switch arm 53 rests against the contact 51 it also engages a contact 57 which is connected by conductor 58 to a contact 59 on the switch $c$. The switch $c$ has a manually movable switch arm 60, adapted to engage either of the contacts 56 or 59, and this switch arm is connected to the side 45 of the supply circuit. Thus, when the arm 52 of the switch $b'$ is in engagement with the contacts 51 and 57, as shown in the drawing, and the switch arm 60 of the switch $c$ is in engagement with the contact 59, current will flow from side 46 of the supply circuit through conductor 47 to the switch member 1 of the thermostat, thence through expansible wire 4 to conductor 50, and thence through $b'$ and switch $c$ to the supply wire 45. When the arm 52 of the switch $b'$ is moved away from the contacts 51 and 57, the circuit just traced will be broken, and when said arm is in engagement with contacts 49 and 54 and switch arm 60 is on contact 56 of switch $c$, current will flow from the side 46 of the supply circuit through conductor 47 to the supply member 1 of the thermostat, thence through expansible wire 3 and conductor 48 to the switch $b'$, thence through switch $c$ to the supply wire 45.

The switch $b'$ is automatically operated by magnets 61 and 62, which are controlled by the switch member 1 of the thermostat device. These magnets are connected in series in a circuit which extends from the supply wire 45, through conductor 63 and resistance 64 to the magnet coils, and thence by conductor 65 to the supply wire 46. The magnet coils are therefore constantly energized when current is flowing through the supply wires. A conductor 66 is connected to a part 67 of the magnet circuit, between the magnets, and the conductor 66 leads to the insulated contact portion $1^c$ on the switch 1. This part of the switch member 1 lies between a stationary contact 68, which is connected by conductor 69 to the supply wire 46, and a stationary contact 70, which is connected by a conductor 71 to the conductor 63, which latter is connected with the side 45 of the supply circuit. With this arrangement, it will be seen that when the part $1^c$ of the switch member 1 is in engagement with the contact 68, the magnet 62 will be short-circuited and the magnet 61 will attract the armature 53 and rock the switch arm 52 away from the contacts 51 and 57 and into engagement with the contacts 49 and 54. On the other hand, when the insulated contact piece $1^c$ on the switch member 1 is moved into engagement with the contact 70, the magnet 61 will be short-circuited and the magnet 62 will rock the switch arm 52 away from contacts 49 and 54 and into engagement with contacts 51 and 57. Thus the switch member 1, co-operating with the pole-changing switch b', automatically alternates the connections of the expansible wires 3 and 4, so that after current flowing in one expansible wire has caused the switch member 1 to engage one of the stationary contacts, 68 or 70, the connection through said wire will be broken and a connection through the other expansible wire will be made. No current can flow through the thermostat unless the switch member 60 of the switch c is in engagement with that one of its stationary contacts which is at the time connected through the switch arm 52 to the thermostat. Thus, if the switch arm 60 is moved on to the contact 59 and the switch member 52 is in engagement with the contacts 57 and 51, as shown in the drawing, a circuit will be completed through these switches and conductor 50 to expansible wire 4, and thence through switch member 1 and conductor 47 to the supply wire 46. If the switch arm 60 is moved on to the contact 56, while the switch arm 52 is in the position shown in the drawing, it will be seen that no current can flow to the expansible wire 3 because the circuit is open at the contacts 49 and 54.

The switch member 1 is shown midway between two contacts 72 and 73, which are electrically connected together, and to a control circuit 74 which is shown connected to the supply wire 45 through a signal lamp 75. The control circuit may be used for various purposes, such as operating a circuit breaker, or other electromagnetic devices.

The operation of the apparatus shown in Fig. 2 is as follows: When the service switch 76 is closed, current flows through the coils of magnets 61 and 62 and the armature 53 adheres to the magnet to which it is closest at the time of the closure of the magnet circuit. Assuming this to be the magnet 62, the switch arm 52 will make up a circuit through the expansible wire 4, which will be completed when the operator closes the switch c upon the contact 59. Current will then flow from supply wire 45 through the switch c and the pole-changing switch and conductor 50 to the expansible wire 4, thence to the switch member 1 and by conductor 47 to the supply wire 46. Should the current in the expansible wire 4 be sufficient to cause said wire to expand, the tension applied to the opposing wire 3 by the spring 9 will rock the switch member 1 to the left and said member will engage the contact 72, and the contact piece 1ᶜ on said member will simultaneously engage the contact 68. When the contact 72 is engaged, the signal or other device 75 will be operated by current flowing from supply wire 46 through switch member 1 to conductor 74 and thence to supply wire 45. At the same time, the magnet 62 will be short circuited by engagement of the contact piece 1ᶜ with the contact 68, and the magnet 61 will attract the armature 53, and the switch arm 52 will thereby be moved so as to interrupt the circuit through the expansible wire 4 and to make up a circuit through the expansible wire 3. The cooling of the expansible wire 4 will cause the member 1 to interrupt the control circuit and to remove the short circuit from the magnet 62, but the armature 53 will continue to adhere to the magnet 61 to which it was rocked. In order to again close a circuit through the thermostat, the operator must move the arm 60 of the switch c on to the contact 56. This completes a circuit through the expansible wire 3. When this latter wire expands sufficiently to cause the switch member 1 to rock to the right, said member engages contact 73 and thereby closes the control circuit, and, at the same time, the contact piece 1ᶜ of the member 1 engages the contact 70 and thereby the magnet 61 is short circuited and the magnet 62 moves the switch arm 52 to break the circuit through the expansible wire 3 and to make up the circuit through the expansible wire 4. While a manual operation of the switch c is required to complete the circuit through the expansible wires, it will be evident that the selection of the course of the current through one expansible wire or the other is automatically performed and that the operator cannot direct the current through one expansible wire repeatedly. As the expansible wires are heated alternately, both wires will be affected alike by any permanent stretching of the wires due to repeated heating and cooling, and the adjustment of the switch member 1 will remain unchanged. Also, as both expansible wires are affected alike by atmospheric temperature, changes in atmospheric temperature will not disturb the adjustment of the switch member 1.

In Fig. 3 of the drawing, a modification of the thermostat device is shown in which the selection of the course of the current through the expansible wires is not automatically controlled. In this view, the pivoted switch member 1ᵈ carries a spring pressed arm 77, adapted to engage the stationary contact 78, to which is connected a conductor 79 in the circuit to be controlled. One supply wire 80 is connected to the switch member 1ᵈ and a switch d is arranged in the other supply wire 81. From the contact 82 of the switch d, a conductor 83 leads through a suitable resistance 84 to the binding post 5 of the thermostat device, and from said binding post the circuit is continued through the expansible wire 3 and switch member 1ᵈ to the supply wire 80. The arm 85 of the switch d may be moved on to contact 82 to complete the circuit just traced, or it may be moved on to the contact 86 to complete a circuit from said latter contact through the conductor 87, resistance 88, expansible wire 4, switch member 1ᵈ, and supply wire 80. The switch arm 1ᵈ may be used for interrupting the circuit through the wire 79 by closing the switch $d$ on the contact 82. When the switch $d$ is closed on this contact, current will flow through the expansible wire 3, and should said wire become heated sufficiently by the current, the member 1ᵈ will be rocked to cause the spring arm 77 thereon to move out of engagement with the contact 78 and thereby interrupt the flow of current through the wire 79. If it is desired to use this form of device for closing a circuit upon the occurrence of a predetermined current flow, the binding post 6 will be adjusted upwardly and the binding post 5 will be adjusted downwardly, these adjustments being sufficient to rock the member 1ᵈ into such position that the arm 77 will be normally out of engagement with the stationary contact 78. If, now, the switch $d$ is closed on the contact 86, current will flow through the expansible wire 4, and if the current is sufficient, it will expand the wire 4 and the member 1ᵈ will rock and cause the spring arm 77 to engage the contact 78 and close the circuit which includes the wire 79. In Fig. 3, both wires are affected alike by atmospheric temperature and changes in such temperature will not affect the adjustment of the arm 1ᵈ. Compensation for permanent stretching of either wire, that may be due to repeated heating of the wire, must be made in this device by adjustment of the binding post to which said wire is attached, but no adjustment is required for changes in atmospheric temperature.

What I claim is:

1. A thermostat relay comprising a centrally pivoted switch member, a slidably mounted cross-head movable toward and from said member and biased away from said member, and thermally expansible wires connected to said cross-head and to said member, at opposite sides of the pivotal axis of the latter, and means for passing an electric current through one of said wires independently of the other wire.

2. A thermostat relay comprising a centrally pivoted switch member, a slidably mounted device movable toward and from the pivotal axis of said member, a spring urging said device away from said member, and thermally expansible wires connecting said device with said member, at opposite sides of the pivotal axis of the latter, and means for passing an electric current through one of said wires independently of the other wire.

In testimony whereof I hereunto affix my signature.

GEORGE H. WHITTINGHAM.